March 10, 1970 S. G. JACKSON 3,499,635
OIL-FIRED HEATER

Filed March 25, 1968 4 Sheets-Sheet 1

INVENTOR.
SAMUEL G. JACKSON

March 10, 1970  S. G. JACKSON  3,499,635
OIL-FIRED HEATER

Filed March 25, 1968  4 Sheets-Sheet 2

INVENTOR.
SAMUEL G. JACKSON
BY
ATTY.

March 10, 1970  S. G. JACKSON  3,499,635
OIL-FIRED HEATER
Filed March 25, 1968  4 Sheets-Sheet 3
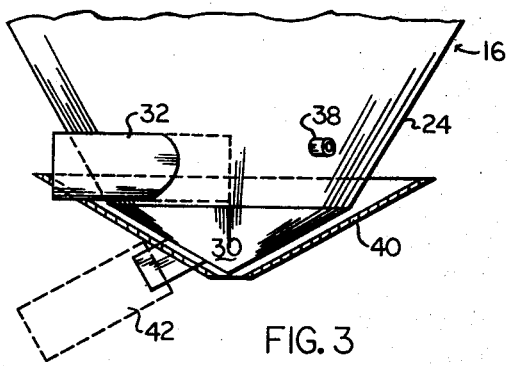
FIG. 3
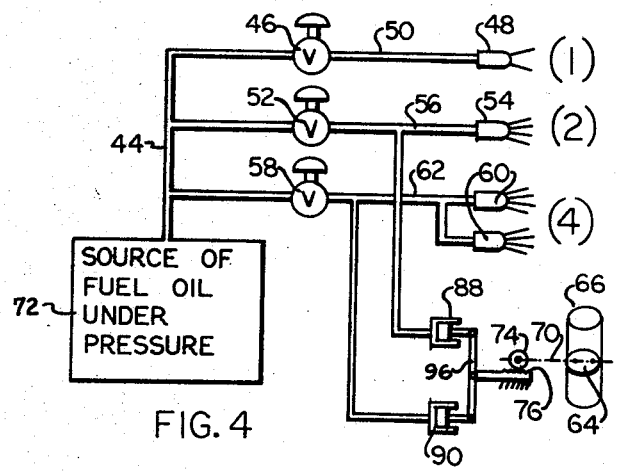
FIG. 4
| STEP | FUEL NOZZLES ACTUATED | | | RELATIVE HEAT OUTPUT | RELATIVE AIR OUTPUT |
|---|---|---|---|---|---|
| | (1) | (2) | (4) | | |
| A | | | | 0 | 1 |
| B | X | | | 1 | 1 |
| C | | X | | 2 | 2½ |
| D | X | X | | 3 | 2½ |
| E | | | X | 4 | 4½ |
| F | X | | X | 5 | 4½ |
| G | | X | X | 6 | 6½ |
| H | X | X | X | 7 | 6½ |
TABLE
FIG. 5
INVENTOR.
SAMUEL G. JACKSON
BY
Atty.

INVENTOR.
SAMUEL G. JACKSON

United States Patent Office 3,499,635
Patented Mar. 10, 1970

3,499,635
OIL-FIRED HEATER
Samuel G. Jackson, P.O. Box 5007,
Lubbock, Tex. 79417
Filed Mar. 25, 1968, Ser. No. 715,883
Int. Cl. F23l 3/00, 5/02; F23n 1/02
U.S. Cl. 263—19    20 Claims

ABSTRACT OF THE DISCLOSURE

A soot-free heater for drying agricultural crops has a sheet metal combustion chamber which includes two conic frustums. The large ends of frustums are joined in the middle of the chamber and the inlet fuel and combustion air are introduced tangentially at the intake end. Three groupings of fuel nozzles, having fuel output of one, two and four units, provide eight levels of output from zero to maximum. An air control linked to the fuel provides combustion air suitable for each output level.

BACKGROUND OF THE INVENTION

Field of the invention

This invention relates to oil-fired air heaters and more particularly to direct fired heaters wherein the products of combustion from the heater are mixed with the drying air and the hot air is used for drying agricultural products.

Description of the prior art

The drying of agricultural crops by heated air has become common. Natural gas is often used to fire these heaters because of the ease in controlling and combusting the natural gas without the production of soot or unburned fuel. It will be understood that in processing or drying grain crops or drying seed cotton if any soot were produced, it would spoil the product being dried. Such a heater must produce no soot.

Some oil-fired combustion chambers of the prior art have been made of fire clay or fire brick. This is a heavy, expensive construction and usually requires from ten to fifteen minutes of warm-up period during which time smokey products of combustion and unburned fuel are mixed with the drying air stream. Stainless steel or other metal combustion chambers have been used in gas turbines, however, the problems in such construction are almost completely remote from the problems in this situation.

It is known that the pressure range upon a pressure atomizing oil nozzle cannot be varied over a great range. This invention fills the need for an automatic system for heat control with a plurality of nozzles and adjustment of air to match the fuel input.

SUMMARY OF THE INVENTION

A closed combustion chamber made of stainless steel has all the sections thereof made of cones or frustums thereof. An advantage is to prevent buckling from temperature expansion. The combustion chamber is closed on the intake side and the entire combustion chamber is circular in cross section. The fuel and combustion air is introduced tangentially.

The combustion chamber is larger at the middle than on either of the ends. Therefore, when combustion is started in a cold chamber, any droplets of oil which will be slung out against the walls of the chamber will drain to a low point and be drained from the combustion chamber, thus preventing an excess of fuel as the combustion chamber warms up and the oil vaporizes. After the combustion chamber has warmed up, the droplets of oil will be separated and slung against the walls of the combustion chamber where they will be vaporized and combustion will take place.

The chamber is cooled by secondary air which passes around it and mixes with the products of combustion thereafter. Various baffles are provided at the outlet side of the combustion chamber for the purpose of deflection of the secondary air for thorough mixing with the products of combustion. Also, they increase the strength of the sheet metal.

Three groups of nozzles are used. Each of the nozzles is supplied either with oil under the optimum pressure or none at all. Therefore, the oil which flows through the nozzle will be properly atomized. Additional or less heat is obtained by activating or deactivating one or more of the various groups.

The primary combustion air is metered according to which of the groups of the nozzles are activated. This is done through a computing linkage which determines the supply of fuel to the nozzles and then adjusts a throttle in the air stream so that a proper amount of air is provided.

An object of this invention is to heat air.

Another object is to dry an agricultural crop with warm, dry air that has no soot or unburned fuel oil at any of several levels of heat output and which does not require a lengthy warm-up period.

A further object is to provide a heater with an improved heat control which is adaptable for remote or automatic control.

Other objects are to achieve the above with a device that is sturdy, compact, durable, simple, safe, versatile, reliable, and efficient, yet inexpensive and easy to manufacture install, operate and maintain.

Still further objects are to achieve the above with a method that is safe, inexpensive and does not require skilled people to install, adjust, operate, and maintain.

The specific nature of the invention, as well as other objects, uses, and advantages thereof, will clearly appear from the following description and from the accompanying drawing, the different views of which are not necessarily to the same scale.

DESCRIPTION OF THE DRAWING

FIG. 3 is a top-plan view of a portion of the inlet end of the combustion chamber of the heater, with heat shield broken away for clarity.

FIG. 4 is a schematic representation of the fuel nozzles and air control system of the heater.

FIG. 5 is a table representing the operation of the nozzles and air control system.

DESCRIPTION OF THE PREFERRED EMBODIMENT

Figure 1:
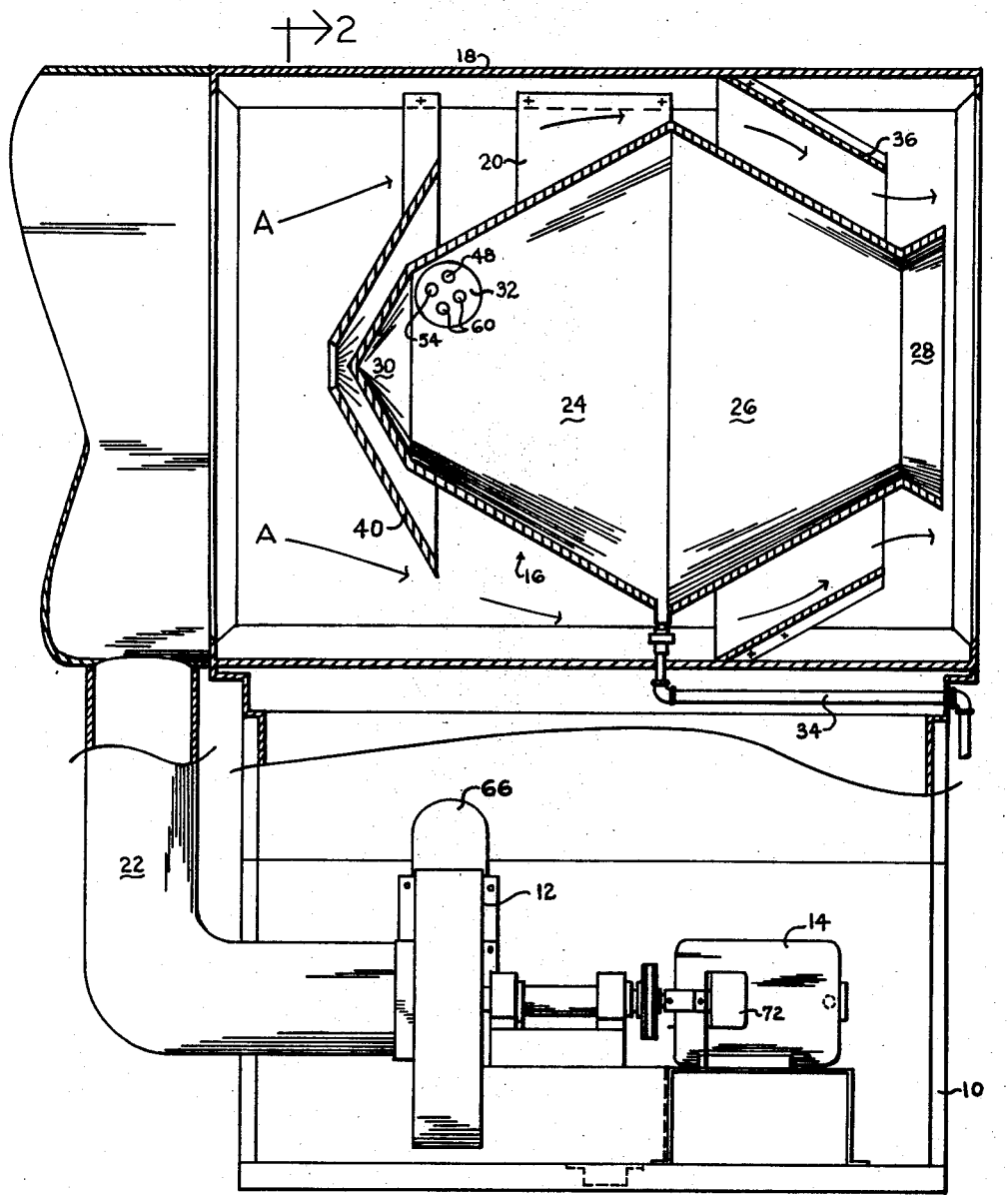
FIG. 1 is a longitudinal sectional view of a heater according to this invention taken substantially on line 1—1 of FIG. 2.
Figure 2:
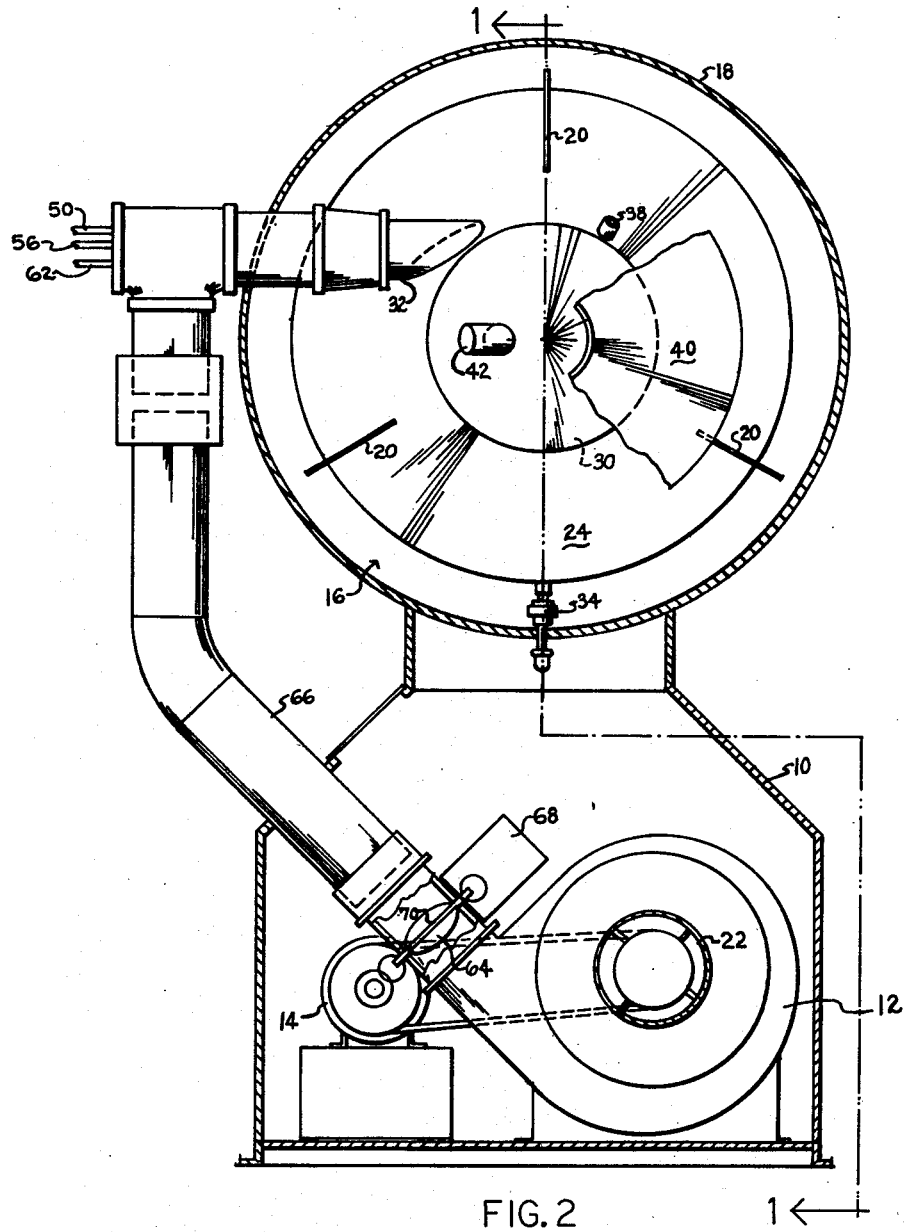
FIG. 2 is a cross sectional view of the heater taken substantially on line 2—2 of FIG. 1 with the parts broken away for clarity.

The illustrated embodiment of this invention is a self-contained unit having frame 10. On the lower portion of the frame is mounted the combustion or primary air fan 12 with motor 14 to power it. Combustion chamber 16 is mounted upon the upper portion of the frame 10. The combustion chamber 16 is made of a heat resistant metal. I have found stainless steel sheet .075 inch thick to be satisfactory for the combustion chamber.

The combustion chamber is surrounded by cylindrical housing 18 which may be made of any suitable material, e.g., aluminum. The housing 18 is directly supported by the frame 10 and the combustion chamber is supported co-axially therewith by three radial vanes 20 which are attached as by welding to the housing 18 and to the combustion chamber 16. The secondary or cooling air is drawn through the annular space between the chamber 16 and the housing 18 by fans not shown. The secondary air is drawn through in the direction of arrows A. The air may be pushed through the housing by a fan on the other end.

The suction inlet 22 to the combustion air fan 12 is illustrated as being connected to the housing 18 near the inlet of the combustion chamber 16. Therefore, if the air is being pulled through the heater by suction, in effect the intake to the fan 12 will be from atmosphere. However, if the air is being blown through the heater by a fan on the inlet side, the inlet to the fan 12 will be above atmospheric pressure and, therefore, the combustion air fan will have that much boost for providing the air to the combustion chamber 16.

The combustion chamber 16 is constructed of four conic elements, three of which are frustums and the other a full cone. The main portion of the chamber is formed of two furstums 24 and 26 of cones having 60° apex angles which are equal and which are joined together on their large end or base. Short diverging frustum 28 is attached to the outlet of the combustion chamber (small end of frustum 26) and performs a dual function. First, it acts to create a turbulence and provide a mixing of the products of combustion from the combustion chamber 16 and the secondary air which flows around the combustion chamber and, also, it adds rigidity to the combustion chamber.

The inlet end of the combustion chamber 16 is closed by a "blunt" or wide-angled cone 30 welded to the small end of the frustum 24. The combustion chamber 16 is circular in cross section. Conic sections are used because they give the desired degree of rigidity and do not buckle or distort readily.

The combustion air and fuel are introduced through tangential tube 32 which is at the inlet end (small end of frustum 24) and adjacent to the closing cone 30. As known in the art, the tangential introduction of the air and the fuel will cause a separation of drops of fuel and they will impinge against the hot walls of the section 24 of the combustion chamber 16 and there they will vaporize where they readily will come in contact with the oxygen in the air likewise circulating in the interior of the combustion chamber resulting in full and complete combustion. During the sixty seconds or so required for the combustion chamber to reach normal operating temperature, a certain amount of the fuel oil will travel along the sides of the combustion chamber to drain pipe 34. This being one of the advantages of the double frustum cone arrangement, i.e., it provides a drainage point for the unburned fuel oil during the warm-up period so that it does not remain in the combustion chamber to be later vaporized, at which time there would be an undesired high level of heat output.

Convergent conic-shaped baffle 36 is supported from the housing 18 near the conic frustum 26 of the combustion chamber 16 which forms the outlet end. This baffle 36 creates a desired flow of the secondary air which cools the combustion chamber and also heats the secondary air. Also, this creates a desired flow for the optimum mixing of the secondary air with the products of combustion.

An ignition spark plug 38 is provided in the initial path of the fuel air mixture coming from the inlet tube 32. Conic baffle 40 or heat shield adjacent the closing inlet cone 30 provids heat protection for photoelectric cell 42. The use of the photoelectric cell 42 to determine whether or not there is flame in the combustion chamber and the ignition plug 38 are conventional and well known to the art.

I have found that the particular design of the combined cones works extremely efficiently in the complete combustion of the fuel and transfer of heat to avoid overheating of the combustion chamber 16, but, also, allowing it to have a temperature high enough for desirable combustion and to allow the flow of the secondary air around it with a minimum pressure drop.

In describing the fuel and combustion air control system, reference is made to FIG. 4 showing a schematic representation thereof. Liquid fuel is supplied through manifold 44 from a source of fuel under pressure such as pump 72 under pressure adequate to cause atomization. Solenoid valve 46 connects the manifold 44 to small fuel nozzle 48 through pipe 50. Solenoid valve 52 connects the manifold 44 to large nozzle 54 through pipe 56. Solenoid valve 58 connects the manifold 44 to two large nozzles 60 through pipe 62 under the same optimum pressure as provided in the header 44. The nozzle 54 has an output of twice as much oil as the small nozzle 48 and the two nozzles 60 have four times the output of oil as the small nozzle 48.

Therefore it may be seen that an electrical switch, not shown, can be provided which has eight positions. If these positions were labeled A through H, they could readily be connected so that eight levels of fuel output could be obtained by activating one or more or none of the three solenoid valves. This is shown in the table of FIG. 5. Inasmuch as the electrical connections by which this can be done is within the skill of an ordinary electrician, it will not be further described in detail here. Obviously the switch by which none, one, two, or all three of the solenoids 46, 52, and 58, are activated could be positioned remote from the heater and, also, could be activated by some desired automatic equipment. For example, some sensing device, such as a humidity sensing device, could be installed in the process and the need for more heat would cause the switch to advance to a position which would produce the desired heat level.

For a change of fuel input, it is necessary to change the amount of air input for proper combustion. This is done by butterfly throttle valve 64 in air conduit 66 from the combustion air fan 12 to the inlet tube 32. This throttle valve 64 has four positions to pass air at the relative levels of 1.0, 2.5, 4.5, and 6.5 units as needed (see the table of FIG. 5).

Figure 6:
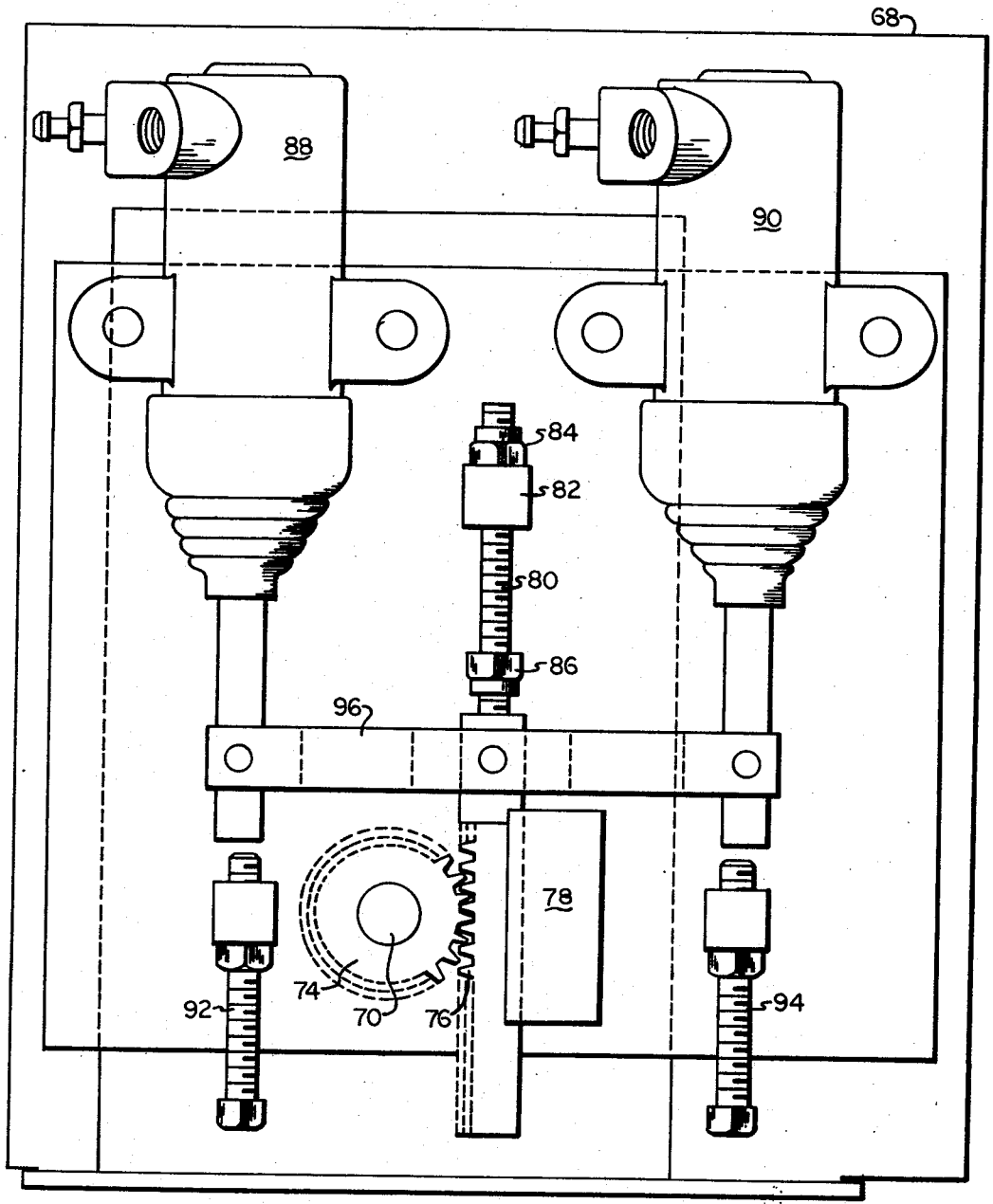
FIG. 6 is an elevational view of the mechanism for changing the position of the throttle valve in the air conduit.

The mechanism by which the butterfly valve 64 is operated is contained within housing 68 and illustrated in FIG. 6. The butterfly valve 64 is mounted upon shaft 70 to which is attached pinion 74. The pinion is operated by rack 76 which is mounted for reciprocating sliding movement in guide 78. The rack 76 is attached to threaded rod 80, which passes through fixed post 82. Lock nut 84 is adjusted on the threaded rod 80 so that when the mechanism is in the illustrated position, the valve 64 will be open to admit 6.5 units of air or the optimum amount of air for 6.0 or 7.0 units of fuel input into the combustion chamber 16. Also, lock nut 86 is set upon this threaded rod 80 to admit 1.0 unit of air or the proper amount of air for the cumbustion chamber when 1.0 unit of fuel is being used, i.e., when only the solenoid valve 46 is open and fuel being admitted only to nozzle 48.

The rack 76 is operated through intermediate positions by the operation of fluid motors 88 and 90. The motor 88 is connected by conduit to the fuel pipe 56. Likewise, the fluid motor 90 is connected by conduit to the fuel pipe 62. A spring (not shown) is attached to the shaft 70 to bias the valve 64 to a closed position. The limit to which the fluid motor 88 extends is limited by set-screw 92 while the extent to which the fluid motor 90 extends is controlled by the position of set-screw 94. Therefore, if two or three units of fuel are being injected into the combustion chamber, the solenoid valve 52 will be open and pressure will exist in pipe 56 and, therefore, the motor 88 will be activated, pushing the motor output shaft against set-screw 92. This extension of the motor 88 will operate through rocker-arm 96 which connects the output shafts of motor 88 and 90 and the rack 76. Therefore, by adjustment of the set-screw 92, the throttle valve 64 may be adjusted to admit 2.5 units of air, which is the proper amount of air to be admitted for 2.0 or 3.0 input units of fuel. Likewise, if 4.0 or 5.0 input units of fuel are being admitted, the fluid motor 90 will be extended against the set-screw 94 and the fuel motor 88 will be retracted and by adjustment of the set-screw 94, the mechanism can be adjusted to admit the proper amount of air for 4.0 or 5.0 input units of fuel. Therefore, it may be seen that there is a separate adjustment for either maximum amount of fuel, minimum amount of fuel, or the two intermediate rates of fuel.

Thus it may be seen that I have provided an air heater suitable for heating air for processing agricultural crops.

It will be apparent that the embodiment shown is only exemplary and that various modifications can be made in the operation, construction, materials, and arrangement within the scope of the invention.

I claim as my invention:

1. In an air-cooled sheet metal smokeless combustion chamber having
   (a) circular cross section throughout the combustion chamber,
   (b) an outlet end,
   (c) an inlet end,
   (d) a source of liquid fuel under pressure, and
   (e) a tangential fuel and air inlet near the inlet end connected to the source;
   (f) the improvement comprising in combination with the above:
   (g) all walls of the combustion chamber being conic sections of sheet metal,
   (h) the combustion chamber being smaller at the ends than therebetween,
   (j) said combustion chamber closed except at the outlet end, and
   (k) a photocell means located in the combustion chamber walls at the inlet end for determining the presence of a flame in the combustion chamber.

2. The invention as defined in claim 1 with the additional limitation of
   (j) a drain pipe
   (k) connected to the lowest part of the combustion chamber which will be in that part of greater dimension between the ends, to drain unburned fuel during warm-up periods.

3. The invention as defined in claim 1 with the additional limitation of
   (j) means attached to said fuel inlet for supplying selected rates of liquid fuel to said combustion chamber, and
   (k) means attached to said air inlet for supplying selected rates of air responsive to the rates of fuel.

4. The invention as defined in claim 1 with the additional limitation of
   (j) a housing of circular cross section
   (k) surrounding the combustion chamber, and
   (m) said housing forming an annular space around the combustion chamber for the flow of secondary air for the purpose of cooling the combustion chamber.

5. The invention as defined in claim 4 with the additional limitation of
   (n) a combustion air fan having
   (o) its intake connected to said housing adjacent the closed inlet end of the combustion chamber, and
   (p) its discharge being connected to said air inlet of the combustion chamber.

6. The invention as defined in claim 4 with the additional limitation of
   (n) an outward flaring flange of conic shape attached to the outlet end of the combustion chamber and
   (o) a convergent conic frustum attached to the housing adjacent the outlet end,
   (p) to improve the structural strength of the chamber and improve the flow and mixing of the cooling air and products of combustion.

7. The invention as defined in claim 6 with the additional limitation of
   (q) a combustion air fan having
   (r) its intake connected to said housing adjacent the closed inlet end of the combustion chamber, and
   (s) its discharge being connected to said air inlet of the combustion chamber.

8. The invention as defined in claim 5 with the additional limitation of
   (t) a drain pipe
   (u) connected to the lowest part of the combustion chamber which will be in that part of greater dimension between the ends, to drain unburned fuel during warm-up periods.

9. The invention as defined in claim 8 with the additional limitation of
   (v) means attached to said fuel inlet for supplying selected rates of liquid fuel to said combustion chamber, and
   (w) means attached to said air inlet for supplying selected rates of air responsive to the rates of fuel.

10. In a combustion chamber having
    (a) a source of combustion air under pressure,
    (b) a source of fuel under pressure,
    (c) an air conduit from the source of air to the combustion chamber, and
    (d) nozzles connectable to the source of fuel,
    (e) said nozzles in the air conduit;
    (f) the improvement in combination with the above comprising:
    (g) at least two fuel valves connected to the source of fuel,
    (h) the nozzles connected to the fuel valves thus making the connection recited above,
    (j) a throttle valve in said air conduit,
    (k) at least one fluid motor,
    (m) a mechanical linkage from the output of the fluid motor to said throttle valve, and
    (n) a fluid connection from the nozzle side of one of the fuel valves to the input of the fluid motor,
    (o) so that the throttle valve is opened wider responsive to fuel pressure on the nozzle.

11. The invention as defined in claim 10 wherein there are two fluid motors and the mechanical linkage between the fluid motors and air throttle valve includes a rocker arm which is linked to the throttle valve.

12. The invention as defined in claim 11 with independently adjustable stops for each fluid motor.

13. The invention as defined in claim 10 with the additional limitation of
    (p) a housing surrounding said combustion chamber thereby forming an annular space around the combustion chamber for the flow of secondary air.

14. The invention as defined in claim 13 with the additional limitation of
    (q) a fan forming said source of combustion air and
    (r) the inlet of said fan connected to said housing.

15. The invention as defined in claim 13 with the additional limitation of
    (q) said combustion chamber formed of sheet metal of conic shapes of circular cross section including
       (i) a closed inlet end,
       (ii) a main chamber smaller at each end than therebetween, and
       (iii) an outward flaring flange at the outlet end, and
    (r) a convergent conic frustum connected to the housing near the outlet end of the combustion chamber.

16. The invention as defined in claim 15 with the additional limitation of
   (s) a fan forming said source of combustion air and
   (t) the inlet of said fan connected to said housing.

17. In a combustion chamber having
   (a) a source of combustion air under pressure,
   (b) a source of fuel under pressure,
   (c) an air conduit from the source of air to the combustion chamber, and
   (d) nozzles connectable to the source of fuel,
   (e) said nozzles in the air conduit;
   (f) the improved method of regulating the fuel and air supplied to the combustion chamber comprising:
   (g) connecting a selected number of said nozzles to the source of fuel,
   (h) determining how many nozzles have fuel pressure on them, and
   (j) partially throttling the air in the conduit responsive to the determination of the nozzles having fuel pressure.

18. The invention as defined in claim 17 with the additional limitation of
   (k) draining any unburned fuel from the combustion chamber.

19. In an air heater
   (a) having a sheet metal combustion chamber
   (b) fired with liquid fuel
   (c) wherein the products of combustion are mixed with the heated output air, and
   (d) the fuel is impinged against hot walls of the combustion chamber to vaporize same,
   (e) the method of firing the heater comprising:
   (f) draining the unburned fuel from the heater during warm-up periods when the walls are not hot enough to vaporize the fuel.

20. The invention as defined in claim 19 with the additional limitation of
   (g) changing the fuel input into the heater by
   (h) applying fuel pressure to different nozzles,
   (j) determining the nozzles having fuel pressure thereon, and
   (k) adjusting the amount of air supplied responsive to the determination of the nozzles with fuel pressure.

References Cited

UNITED STATES PATENTS 2,206,553   7/1940   Nagel.
2,285,718   6/1942   Isaacson.

JOHN J. CAMBY, Primary Examiner